(12) United States Patent
Lubeck et al.

(10) Patent No.: US 8,175,001 B2
(45) Date of Patent: *May 8, 2012

(54) NETWORK CONNECTIVITY

(75) Inventors: Mark Lubeck, San Jose, CA (US);
Naveen Kondapalli, San Jose, CA (US);
Jagadeesh Kasaraneni, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/567,612

(22) Filed: Sep. 25, 2009

(65) Prior Publication Data

US 2010/0082781 A1   Apr. 1, 2010

Related U.S. Application Data

(63) Continuation of application No. 11/171,578, filed on Jun. 29, 2005, now Pat. No. 7,609,654.

(60) Provisional application No. 60/584,806, filed on Jul. 1, 2004.

(51) Int. Cl.
*H04J 1/16* (2006.01)
*H04L 12/56* (2006.01)

(52) U.S. Cl. ............... 370/252; 370/254; 370/419

(58) Field of Classification Search ............ 370/254, 370/252, 419
See application file for complete search history.

(56) References Cited

U.S. PATENT DOCUMENTS

| | | | |
|---|---|---|---|
| 6,636,239 B1 | 10/2003 | Arquié et al. | |
| 6,765,919 B1 | 7/2004 | Banks et al. | |
| 6,772,207 B1 | 8/2004 | Dorn et al. | |
| 6,833,850 B1 | 12/2004 | Arquie et al. | |
| 6,836,275 B1 | 12/2004 | Arquie et al. | |
| 6,880,127 B1 | 4/2005 | Arquie | |
| 6,952,208 B1 | 10/2005 | Arquie et al. | |
| 6,975,963 B2 | 12/2005 | Hamilton et al. | |
| 6,980,525 B2 | 12/2005 | Banks et al. | |
| 7,219,300 B2 | 5/2007 | Arquié et al. | |
| 7,269,133 B2 | 9/2007 | Lu et al. | |
| 7,292,535 B2 | 11/2007 | Folkes et al. | |
| 7,310,774 B1 | 12/2007 | Arquie et al. | |
| 7,468,975 B1 | 12/2008 | Davis | |
| 7,505,604 B2* | 3/2009 | Zakrzewski et al. | 382/100 |
| 7,583,681 B2 | 9/2009 | Green | |
| 7,706,340 B2* | 4/2010 | Bronez | 370/338 |
| 7,936,769 B2 | 5/2011 | Chung et al. | |
| 2004/0025018 A1* | 2/2004 | Haas et al. | 713/168 |
| 2004/0075680 A1 | 4/2004 | Grace et al. | |
| 2004/0151174 A1 | 8/2004 | Del Signore et al. | |
| 2005/0169056 A1 | 8/2005 | Berkman et al. | |

(Continued)

OTHER PUBLICATIONS

CNT Introduces New Generation Storage Networking Infrastructure, at http://web.archive.org/web/20050206034944/www.cnt.com/cnt/news/pr/2004/07-19-00, 3 pages, © 2003-2005, printed Jul. 19, 2006.

(Continued)

*Primary Examiner* — John Pezzlo
(74) *Attorney, Agent, or Firm* — Wong, Cabello, Lutsch, Rutherford & Brucculeri, L.L.P.

(57) ABSTRACT

A method for managing a computer or communication network by obtaining connectivity configuration information from a plurality of networked devices; analyzing the connectivity configuration information from the plurality of networked devices; and, determining a state of connectivity between any two of the plurality of networked devices.

20 Claims, 6 Drawing Sheets

U.S. PATENT DOCUMENTS

| | | | |
|---|---|---|---|
| 2005/0193103 A1* | 9/2005 | Drabik | 709/221 |
| 2005/0254438 A1* | 11/2005 | Turk et al. | 370/254 |
| 2006/0178918 A1 | 8/2006 | Mikurak | |
| 2007/0223502 A1 | 9/2007 | Green | |
| 2009/0290589 A1 | 11/2009 | Green | |
| 2009/0307346 A1 | 12/2009 | Patil et al. | |
| 2011/0051624 A1 | 3/2011 | Gnanasekaran et al. | |

OTHER PUBLICATIONS

Cisco MDS 9000 Family of Multilayer Directors and Fabric Switches, at http://www.cisco.com/en/US/products/ps6446/prod_brochure0900aecd80355d56.html, 3 pages, © 1992-2005, printed Jul. 19, 2006.

Cisco MDS 9000 Family Networked Storage Solutions for Small and Medium-Sized Businesses—At-a-Glance, 2-page product brochure, © 1992-2005 Cisco Systems, Inc.

DStar: CNT Remains FICON Leader with UltraNet Multi-Service Director, at http://www.taborcommunications.com/dsstar/04/1109/109456.html, 2 pages, printed Jul. 19, 2006.

CD/9000 Channel Director—Product Detail by CNT, at http://web.archive.org/web/20050204044510/www.cnt.com/products/switching/cd9000, 2 pages, © 2003-2005, printed Jul. 19, 2006.

FC/9000 Fibre Channel/FICON Director—Product Detail by CNT, at http://web.archive.org/web/20050205081213/www.cnt.com/products/switching/fc9000, 3 pages, © 2003-2005, printed Jul. 19, 2006.

McData—Intrepid® 6140 Director, product brochure, 2 pages, © 2006 McData Corporation.

McData—Intrepid® 10000 Director, product brochure, 2 pages, © 2006 McData Corporation.

Brocade; "Fabric Manager User's Guide"; Supporting Fabric Manager v4.4.0; Supporting Fabric OS v4.40; Supporting XPath OS v7.1.0; Publication No. 53-0000823-09; Publication Date: Oct. 13, 2004.

Brocade; "Fabric Manager Administrator's Guide"; Supporting Fabric Manager 5.0; Supporting Fabric OS v5.0.1; Supporting XPath OS v7.3.0; Publication No. 53-0000823-10; Publication Date: Mar. 29, 2005.

Fibre Channel Switch Fabric-4 (FC-SW-4) Rev. 7.0; INCITS working draft proposed American National Standard for Information Technology; Jul. 23, 2004.

Network Working Group; OSPF Version 2; Acsend Communications, Inc.; Apr. 1998.

IEEE Standards; 802.1D™; IEEE Standard for Local and Metropolitan area networks; Media Access Control (MAC) Bridges; IEEE Computer Society, Jun. 9, 2004.

International Standard; ISO/IEC 10589; Information Technology—Telecommunications and information exchange between systems—Intermediate System to Intermediate System intra-domain routeing information exchange protocol for use in conjunction with the protocol for providing the connectionless-mode network service (ISO 8473); Second edition, Nov. 15, 2002.

* cited by examiner

| Label | Storage Port... | Host Port La... | Masked | Bound | Cabled | Zoned | Visible |
|---|---|---|---|---|---|---|---|
| Flare LUN 0 | A1 | 210000E08B... | No | Yes | No | No | 401 |
| Flare LUN 0 | A0 | 210000E08B... | No | Yes | No | No | |
| Flare LUN 0 | A1 | 210000E08B... | No | Yes | No | No | |
| Flare LUN 0 | A0 | 210000E08B... | No | Yes | No | No | |
| Flare LUN 0 | A1 | 10000000C9... | No | Yes | No | No | |
| Flare LUN 0 | A0 | 10000000C9... | No | Yes | No | No | 401 |
| Flare LUN 0 | A1 | 210000E08B... | No | Yes | No | No | |
| Flare LUN 0 | A0 | 210000E08B... | No | Yes | No | No | |
| Flare LUN 0 | A1 | 10000000C9... | No | Yes | No | No | |
| Flare LUN 0 | A0 | 10000000C9... | No | Yes | No | No | |
| Flare LUN 0 | A1 | 10000000C9... | No | Yes | No | No | |
| Flare LUN 0 | A0 | 100000173... | No | Yes | No | No | |
| Flare LUN 0 | A1 | 100000173... | No | Yes | No | No | |
| Flare LUN 0 | A0 | 10000000C9... | No | Yes | No | No | |
| Flare LUN 0 | A1 | 200000E069... | No | Yes | No | No | |
| Flare LUN 0 | A0 | 200000E069... | No | Yes | No | No | |

NETWORK CONNECTIVITY

RELATED APPLICATIONS

This application is a continuation of U.S. Nonprovisional application Ser. No. 11/171,578, entitled "Network Connectivity" and filed Jun. 29, 2005 and further claims priority of U.S. Provisional Application No. 60/584,806, entitled "Cross-network Connectivity Tables" and filed on Jul. 1, 2004, both of which are specifically incorporated herein for all that they disclose and teach.

TECHNICAL FIELD

The present invention relates, in general, to network management, and, more particularly, to software, data structures, systems and methods for evaluating connectivity in computer or communication networks such as storage area networks.

BACKGROUND

Computer data storage systems have grown from direct-attached storage, where one or more disk drives are coupled to a system bus, to the more recently developed, higher capacity network-attached storage and storage area network technologies. Such greater capacity systems also present higher reliability, and higher availability. Moreover, storage area networks or "SANs" provide infrastructure on which sophisticated storage solutions can be built. Benefits include the ability to share a large storage device across many servers or applications, as well as the ability to create arrays of multiple physical storage devices to present large storage capacities (e.g., terabytes). In such systems, host computers (e.g., servers) couple to the physical storage devices via networks or fabrics that may include one or more switches. Each switch may implement a plurality of ports, some of which providing for connection to one or more host computers and others of which providing connections to the storage devices.

A large physical storage capacity is often difficult to use efficiently. Configuring, maintaining, and backing up large storage volumes can be time-consuming. Also, it can be difficult to integrate large storage volumes into RAID arrays to obtain improved availability and reliability. To improve sharing such a large storage capacity amongst many host computers and processes, the storage is typically segregated into smaller pieces called logical units which are then assigned to one or more host computers.

SANs can be complex systems with many interconnected computers, switches and storage devices, and this complexity can make it difficult for SAN administrators to troubleshoot a problem, particularly where the problem occurs as a connectivity issue, whether in or to the host computers, the switches, the storage devices themselves, or in or to the ports of the host computers, storage devices and/or the switching fabric, or in any of the physical interconnections therebetween, amongst other possible sources of error. Thus, a benefit may accrue to SAN administrators upon the provision of a simplified way to confirm connectivity across a network, and to isolate the reason or reasons for a particular connectivity failure if they find a lack of connectivity. Physical connections and the configurations of multiple devices can all contribute to a connectivity failure. The SAN administrator must determine which cause or causes are at fault on the many possible paths between one side of the network and the other. In addition, SAN administrators may select appropriate objects (e.g., host computers, switch ports and storage devices) to connect to each other. The more a SAN administrator knows about the state of the network, and the possible paths between end objects, the easier it is to select objects that will require a minimum of effort to connect successfully.

In the past, SAN administrators have had to physically inspect the end-to-end cable paths and then invoke multiple software applications to record and view the configurations on multiple devices to determine the cause or causes of a connectivity failure. This has involved steps of reviewing multiple event logs, and/or maintaining complicated spreadsheets to try to isolate the source of a problem. This work is especially time consuming if there really is no network connectivity and the network administrator is called upon to "prove a negative," by showing that there are no failures or wrong configurations in the network. Network administrators have also used spreadsheets to maintain relevant pieces of data, often on separate sheets, to determine which objects are the best candidates for connection. A solution, particularly in the form of a system, software and/or methods for software, data structures and/or systems for confirming connectivity in storage area network is currently unavailable.

SUMMARY

Implementations described and claimed herein address the foregoing problems by providing methods and systems which provide improvements in the evaluation or management of the connectivity of computer or communication network systems. Briefly stated, the present invention involves a method for evaluating a network connectivity condition by obtaining device configuration information, determining whether the device configuration information fulfills a network connectivity condition between at least two resources.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave or other communication media by a computing system and encoding the computer program.

Other implementations are also described and recited herein.

DETAILED DESCRIPTION

The specific implementations described herein are examples only, and not limitations of the claimed subject matter. For example, network connectivity is described herein in some implementations using fibre channel technologies and fibre channel architecture, however, other network technologies and/or architectures may provide suitable functionalities in particular environments. Alternative examples include SCSI (small computer system interface), internet protocol (IP) and FICON, inter alia. Similarly, in some implementations, e.g., fibre channel or SCSI, storage capacity is here presented as logical units, identified by logical unit numbers (LUNs), although the protocol may readily be varied to meet a particular application.

Figure 1:
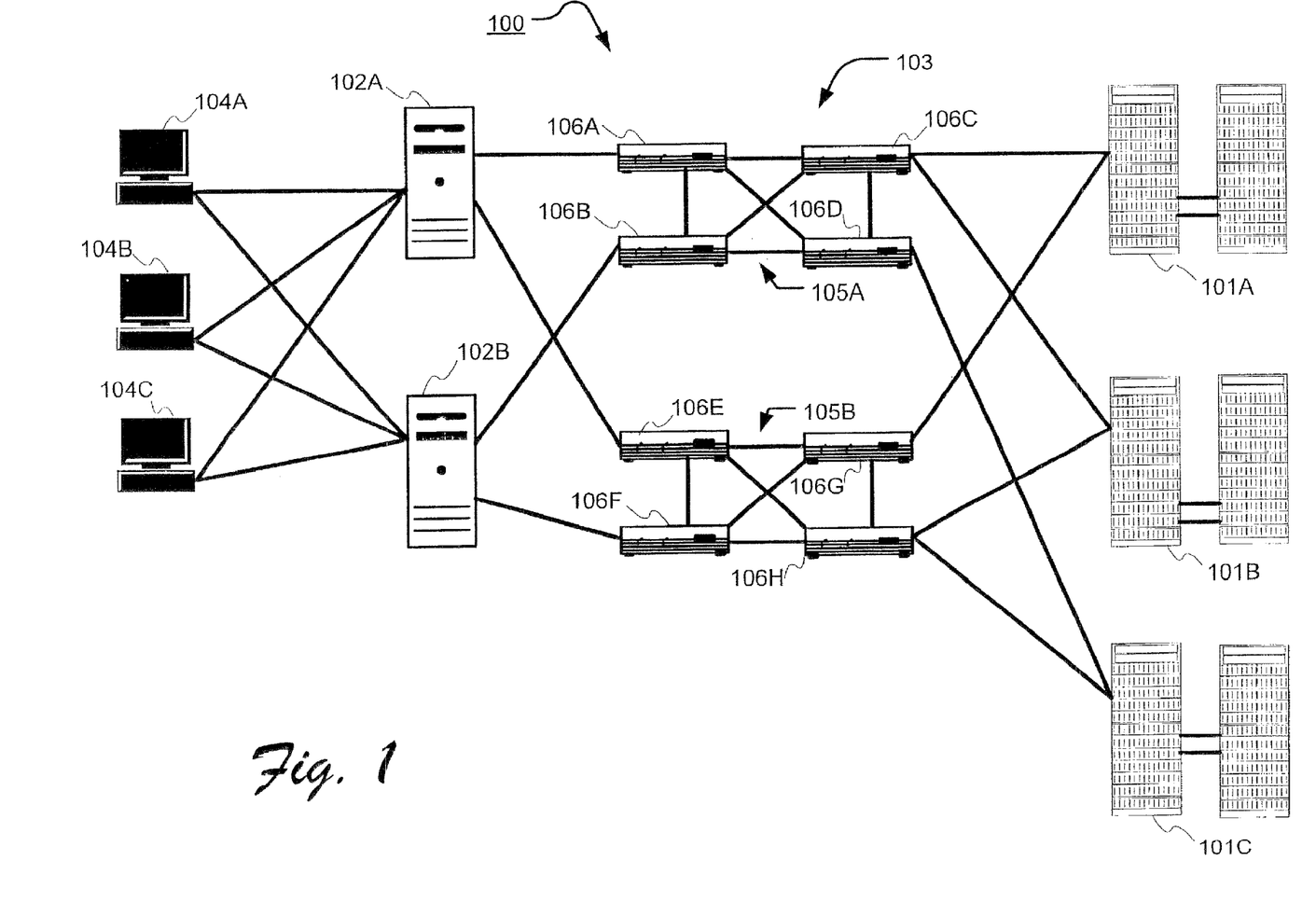
FIG. 1 is a schematic view of a storage area network (SAN) environment.

FIG. 1 illustrates a general storage area network (SAN) 100 implementing features in accordance herewith. The example shown in FIG. 1 may be disposed in a single site, or may be dispersed in a multi-site application. The SAN 100 may include a number of networked devices, and as a principal hereof, may include one or more storage cells 101, such as cells 101A, 101B and 101C shown here. The storage cells may also be paired for redundancy as shown here also. Any number of storage cells 101 may be included in any site and/or in any particular SAN. The storage cells 101 may include any of many types of physical storage devices, such as hard disk drives, tape drives, optical drives, and the like. The storage implemented at various sites is accessed by a host computer or server 102, hereafter collectively referred to as "hosts," such as hosts 102A and 102B. Host computers are generally machines that themselves require data storage or provide linkage via a local area network to end-users or application clients 104 (see end-users/clients 104A, 104B and 104C) which require storage. Typical hosts 102 may demand large quantities of storage such as mainframes, web servers, transaction processors, and the like. However, a host computer 102 may comprise a computer of any processing capacity that requires or benefits from network storage either to reduce cost of the host 102, implement more storage capacity than practical in a host 102, share data amongst multiple hosts 102, or the like.

Generally, a host 102 may couple to one or more storage cells 101 via a connection or multiple connections to a data communication network 103. Storage cells 101 may each implement a quantity of data storage capacity that is accessible through and controllable by storage controllers disposed within each storage cell 101, the storage controllers (not separately shown) having one or more connections or ports to the network 103. Storage cells 101 may typically implement hundreds of gigabytes to terabytes of physical storage capacity that may be carved into a plurality of logical units each being identified by an assigned logical unit number or LUN. The LUNs implement an arbitrary, pre-assigned quantity of logical block address storage, and each LUN may have a specified level of data protection such as RAID 0-5 data protection. Hosts 102 access physical storage capacity by having read and write operations addressed to specified LUNs, and can be otherwise unaware of the physical storage architecture or data protection strategy for a particular LUN that is being accessed. The storage controllers of the storage cells 101 manage the tasks of configuring and/or allocating physical storage capacity to specified LUNs, monitoring and maintaining integrity of the LUNs, moving data between physical storage devices, and other functions that maintain integrity and availability of the data stored therein. The storage cells 101 are programmable to control the addressing and accessing of data from and by particular hosts 102.

Network 103 may include any of a variety of available networks, and may include a plurality of interconnected networks. In particular examples, network 103 may include at least two independent fibre channel fabrics 105, see fabrics 105A and 105B in FIG. 1, to provide redundancy. These fibre channel fabrics may include long-distance connection mechanism (not shown) such as asynchronous transfer mode (ATM) and interne protocol (IP) connections that enable sites to be separated by arbitrary distances. The fabrics 105 may be made from a number of switches 106, see switches 106A, 106B, 106C and 106D in fabric 105A and switches 106E, 106F, 106G and 106H in fabric 105B. As shown in FIG. 1, the various switches may be connected in redundant manners to ensure that if any particular connection between switches in not active for any reason, then a redundant path may be provided via the other connections and/or other switches.

Figure 2:
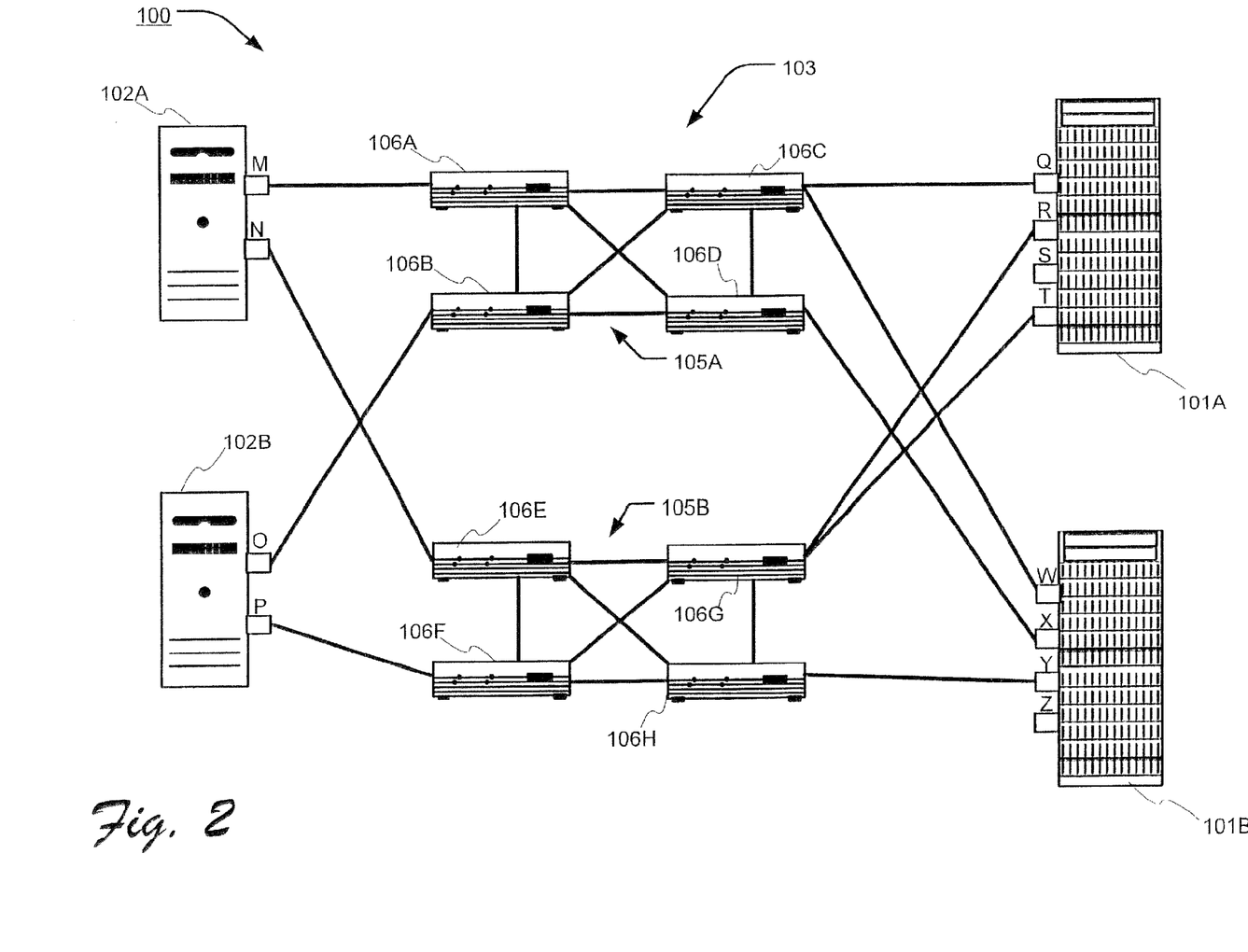
FIG. 2 is a further schematic view of at least a portion of a storage area network (SAN) environment.

FIG. 2 shows a further detailed view of an exemplar SAN 100 with more specificity of connectivity. For example host 102A is shown having two ports M and N which are each connected to both of the fabrics 105A and 105B. Host 102B, with respective ports O and P, is shown where each port is connected into only one of the respective fabrics 105A and 105B. On the other side of the fabrics 105A and 105B are the storage cells 101A and 101B which are shown having four ports apiece (fewer or more ports may be available per storage cell depending upon the storage cell). Storage cell 101A has ports Q, R, S, and T where cell 101B has ports W, X, Y and Z. The storage cells are then shown connected to the fabrics of the storage area network via one or more of the respective ports. Here for example only, storage cell 101A is shown connected via port Q to both fabrics 105A and 105B, and only to fabric 105B via port T (ports R and S are not connected to the network here). Similarly, storage cell 101B is shown connected via port X to both fabrics and by port W to only fabric 105A and by port Y only to fabric 105B (port Z remains unconnected). In a port to port connectivity system, it can be seen that ports M and N of host 102A are thus connected by any of various paths through the variety of switches in the fabrics 105 to any of ports Q and T of cell 101A and any of ports W, X and Y of cell 101B. Ports O and P are more limited in their ultimate connectivity such that port O is only physically connected to port Q of cell 101A and only to ports W and X of storage cell 101B. This physical connectivity is determinable in one implementation hereof as described further below. Note, the connectivity shown in FIG. 2 is an exemplar for use in description only; it is not intended to demonstrate common connectivity conditions.

Connectivity conditions may be viewed on a further detailed basis, and for such it may be useful to consider the each of the entities which communicate with one or more other entities, thus requiring at least one connectivity segment for completion of a communication. These entities or resources may include for example, the ports on either the storage cells 101 or the hosts 102, or may include switch ports (not separately shown) or the switches 106 themselves. Moreover, the resources may include the LUNs, resident in the storage cells 101, and/or may include any applications in the hosts 102 (similar hardware and/or software in the switches or other hardware items may in some cases also be separately identified as resources, though not separately discussed here). Then, a resource-to-resource communication may be tracked, as for example, from an application resource resident in a host first to port resource on that host. Communication may be tracked then from that port resource to a switch resource, and from there to a storage cell port, which then ultimately communicates with a LUN resource resident in the storage cell. Tracking can take place in reverse of this as well, and/or may be limited to view of one or more of the various segments. The communication line from resource to resource may be referred to herein as a segment, as in a segment or portion of the network path. In FIG. 2, a communication line is shown disposed from port M of host 102A to the port of switch 106A; this communication line is an exemplar segment between resources.

Next however, returning briefly to FIG. 1, in an implementation hereof, at least one SAN management tool, whether by software and/or by appliance may be used to fulfill methodology and/or system technology shown and described herein. As shown in FIG. 1 such a tool may be implemented as or within a storage cell 101, a host 102, a client 104 or a switch 106, or a completely separate appliance, any of which being coupled to network 103 as shown. In practice, the SAN management tool may often be situated in a form such as one or more of the clients 104, and will be referred to hereafter as tool 104C, a particular one of the clients 104. In general however, the tool may be connected to the network via the cabling in place for the other networked devices, or in other implementations, the tool may be separately connected to each of the networked devices in which it is interested. Indeed, the tool may be connected via fibre channel or SCSI or other protocols in the same fashion as the other networked devices, or the tool may be separately connected to one or more or each of the other networked devices via the same protocol or perhaps even a separate discrete protocol such as an IP protocol. Note, either one or a number of tools may be provided. However, because each tool communicates through either network 103 or separate connections (not shown), the physical location of the tool(s) may be relatively arbitrary. Such tools may also be implemented to provide redundant connections to the storage cells 101.

Information about connections, connectivity, functionality and other state information about the SAN is configured in and maintained by the various networked devices and applications implemented on various of such devices including the storage cells 101, the host computers 102, the switches 106 and/or other potential devices (not shown) within network 103. This information is also referred to herein as device configuration information, and it may also include what may be more specific resource configuration information (e.g., as in port configuration information on the hosts or storage cells). It may also be that the SAN management tool, whether tool 104C or otherwise, as well as other devices, applications and systems may have interesting configuration information also. The methodology and/or systems hereof may operate to gather data from these multiple devices and applications and provide analysis hereof and/or may present the user with connectivity implications thereof including in some implementations one or more of the following resource configuration information:

> Physical cabling
> Physical and logical Port Status, including
> > Logical switch Port Blocking
> > Logical switch Port Fencing
> Physical Errors or Failures
> Logical Security Settings, including
> > Enterprise Fabric Mode
> > Fabric Binding
> > Switch Binding
> > Port Binding
> > Device Authentication
> Logical switch Zoning
> Logical LUN Masking
> Logical LUN Binding
> Logical File System Mounting
> Logical Host Login To Storage
> Actual Physical In-Band Visibility, and/or
> Other relevant data.

In some implementations, the LUN Masking and LUN Binding information is configured in and maintained in the storage cells 101, while the zoning and cabling information is configured in and maintained in the switches 106. Thus, the querying or interrogating of the networked devices may want to include obtaining this information from at least the storage cells 101 and the switches 106 (note, though the tool 104C is not shown separately connected (via lines 108) to each and every device therein, it may not be necessary for these queries, even if it may be preferable to do so for ensuring obtaining discovery of all of this information). The hosts 102 may also have interesting information configured therein as for example including visibility and mounting information (see below).

Figure 3:
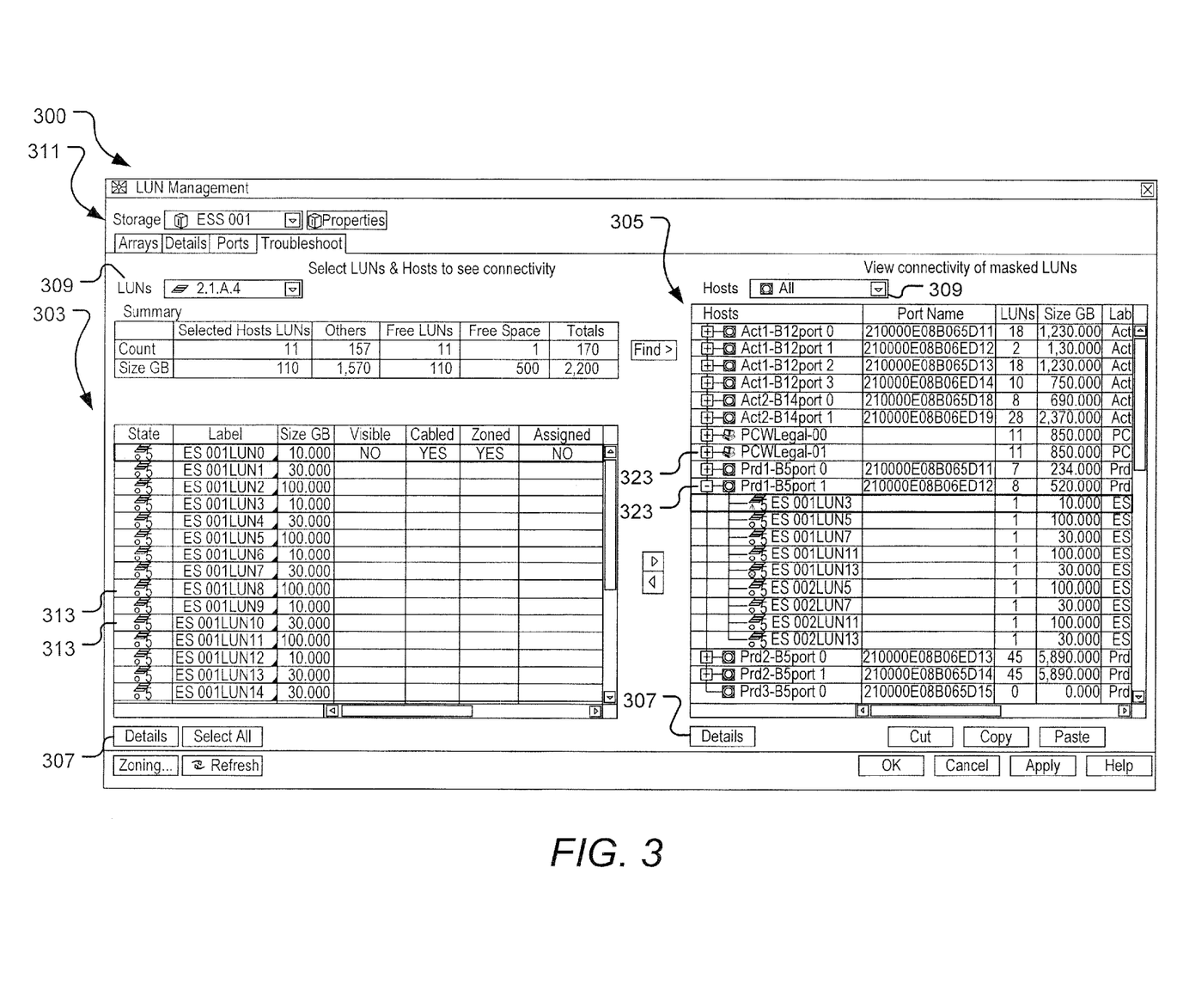
FIG. 3 is a view of a user interface in accordance with the technology described herein.
Figure 4:
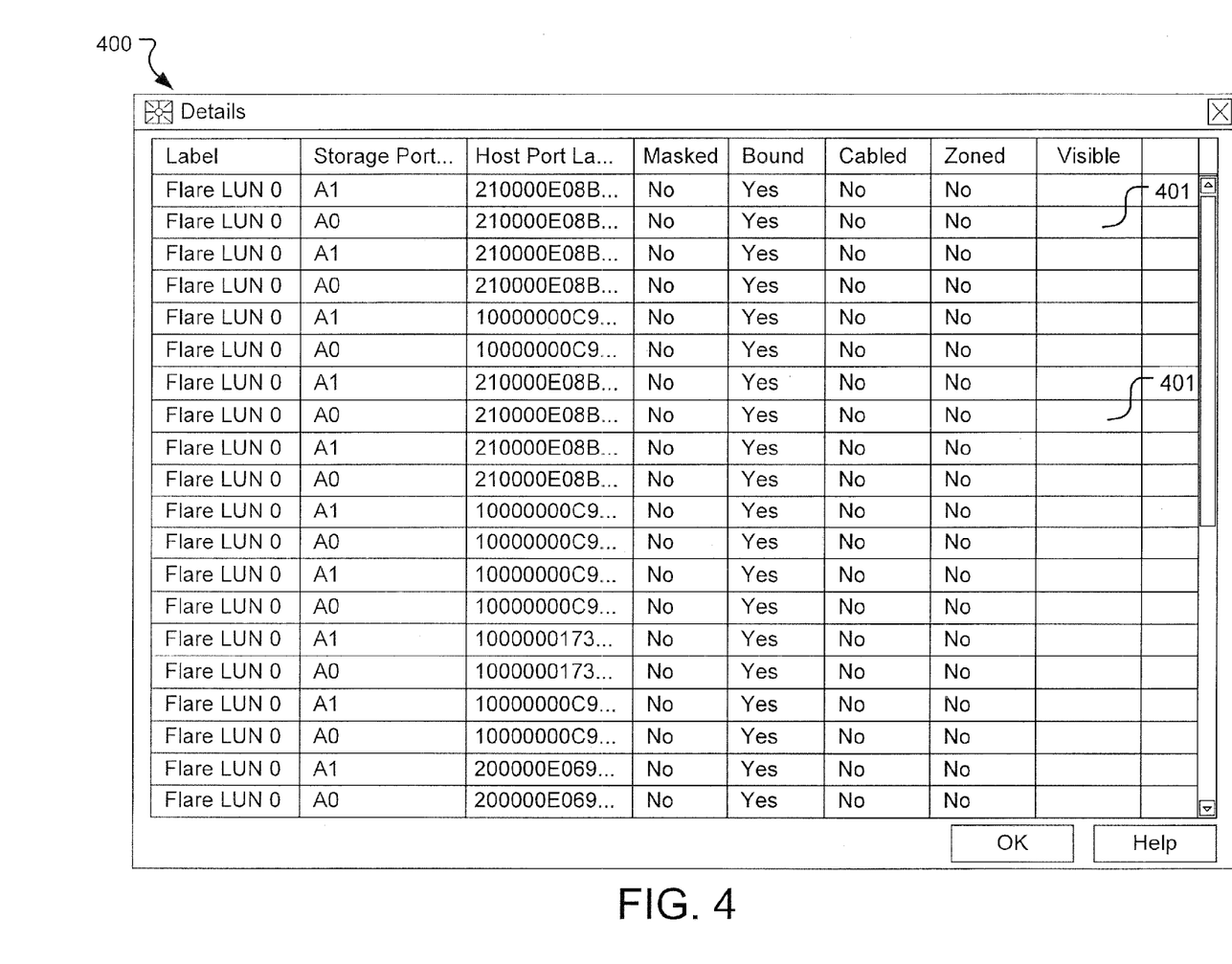
FIG. 4 is a view of another user interface in accordance with the technology hereof.

This data may be either or both of analyzed for determination of a connectivity conclusion and/or presented in a user interface 300 as shown in FIG. 3 in a manner that presents both sides (e.g., a LUN side and a Host side) for simplified troubleshooting analysis. For any Host/LUN combinations, the methodology and/or system hereof may provide an "additional details" table 400 as shown in FIG. 4 that provides a similar analysis for every possible path between the two end objects. There are two main problems solved: first, greatly reduced are the time and effort required to confirm connectivity across a network, or disconfirm it and isolate the cause. Second, greatly reduced also are the time and effort required to select an appropriate candidate object that will require the minimum number of actions to complete connectivity across a network.

An implementation of a user interface 300 is shown in FIG. 3 and presents network entities and shows which objects have been discovered and are associated with and/or connected with each other, or in some implementations which are available to be associated with and/or connected with each other. The user interface 300 includes a LUNs table 303 on the left hand side of user interface 300 and a Hosts table 305 on the right hand side of user interface 300. In this particular implementation, a user may operate control 311 to select a particular physical storage device (e.g., ESS 001 in the example of FIG. 3). Each row 313 corresponds to a logical network entity such as a LUN (e.g., ESS001LUN0 through ESS001LUN14 in the example of FIG. 3). Each row may present selected information about the object such as is presented in the columns labeled "State" and "Size". In the example of FIG. 3, the state column indicates the type of data protection provided by that LUN (e.g., RAID level) and is color coded to indicate status of that LUN as online and functioning normally, online but down temporarily, offline or faulted, or unknown status.

Host table 305 may contain an entry 323 for each of the objects on the host side of the network. Each entry 303 may contain some basic properties of the object, and columns for substantially the same connectivity elements or conditions listed in the LUN table 303. Host table 305 is constructed as a tree table in that an entry 303 may be expanded by clicking on the "+" control so as to display components associated with that entry. As shown in FIG. 3, the host port named "210000E08B06ED12" associated with a host named "Prd1-B5" is associated with eight LUNS.

For each row 313 there is a series of columns that display the various configurations and elements, also referred to herein as connectivity conditions, that must be in place to support connectivity. For example, in FIG. 3 the LUN table 303 (and table 305 as describe below) includes columns labeled "Masked", "Bound", "Cabled", "Zoned", "Visible", and "Assigned" as well as any number of additional columns that would be visible by scrolling right. Some of this state information may be retrieved from pre-assembled configuration data sources and/or configuration information stored in the various SAN objects such as hosts, switches, port modules, storage devices, and the like. SAN devices often include monitoring and discovery processes that routinely gather information about connectivity and other SAN state information that is relevant to their own operation and store that state information in local data structures. It is also contemplated that the methodologies and/or systems hereof may initiate these discovery processes, sometimes referred to as instrumentation processes, to dynamically gather this information. The meaning associated with each of these columns is:

Masked—Represents whether the selected LUN is masked to which of the selected host ports. Within each of the storage cells, the storage is defined in parts, sometimes referred to as logical units, each such unit having an assigned identifying number. LUN Masking is a configuration which may be represented in a form of a list or table or the like (usually maintained in the storage cell) which keeps track of which LUNs have been configured, i.e., identified/defined as allowed to communicate with particular Host ports. LUN masking is used to assign appropriately sized pieces of storage from a common storage pool to respective hosts/servers. LUN masking allows for large storage devices to have the storage capacity thereof divided into more manageable pieces. LUN masking also allows reasonably sized file systems to be built across many physical storage devices to improve performance and reliability, and it is oftentimes part of the fail-over process when a component in the storage path fails.

Bound—Represents whether the storage cell ports for accessing this LUN from these hosts are defined. The LUNs within the storage cells may also be pre-defined to or be limited in their respective communications through respective storage cell ports (to balance loads or traffic). Thus, like LUN Masking, LUN Binding may be a configuration in the form of a list or table or the like (again usually maintained in the storage cell) keeping track of the LUN to storage cell port definitions.

Cabled—Represents whether there is any physical connection between any storage port and any or all of the selected host ports. This again is switch maintained data of the physical connections to the switch, and thus from the switch to which particular host and storage cell ports.

Zoned—Represents whether there are any zones in the active zone set connecting any storage port and any and/or all of the selected host ports? This is a configuration determination of which storage cell ports are defined to be allowed to communicate with which host ports, port to port. The converse is also determinable herefrom, i.e., which storage ports are defined as not allowed to communicate with which host ports. Note, the term "zone" and/or "zoned" has been used with this definition particularly related to storage area network technologies; however the concept of "domaining" in internet protocol (IP) has the substantially the same meaning. Thus, hereafter use of the word "zone" or a variant thereof is intended to encompass "domaining" throughout this description as well as the claims appended hereto.

Visible—Represents whether the storage manager has an in-band view of the storage device from all of the selected hosts, can the storage manager send and receive a SCSI query between all of the selected hosts and the selected LUN? This is information on the connectivity as viewed from the host.

Storage Ports—Lists comma-separated values for all the bound storage ports.

Mounted—Represents whether the selected LUN is mounted to the operating system (OS) file system on the host server, i.e., does the host software recognize or have defined a communication with a particular LUN.

Then, the value presented in each cell of the table (see FIGS. 3 and 4) is a result of the analysis of answering the question: Is this element in place to allow connectivity between this tree node and this associated object? In the particular example, for each cell in the table one of the following four values is presented:

Yes—This element is configured for connectivity

No—This element is not configured for connectivity

*Yes—(Conditional Yes) This element is configured for connectivity but not on the same path as other required configuration elements.

*No—(Conditional No) This element is not configured for connectivity, yet connectivity has been verified.

*If zoning=yes and cabled=yes but not on the same storage port then zoning=conflict yes and cabled=conflict-yes.

*If zoning=yes and cabled=yes and masked=yes and visible=no then visible=conflict-no.

The conditional yes and conditional no values are appropriate when an obvious error condition is detected or if the data is correct but potentially misleading. In a particular implementation the color of the text may be made to change to red (or some other warning color). Three analytical examples follow.

In a first example, consider a situation in which the storage device's assignment table indicates that LUN0 (labeled ES001LUN0 in FIG. 3) is not assigned to host port "Prd1-B5port 1". But for some reason LUN0 is "Visible" to the host port. In such a case the Visible column in the row labeled "ES001LUN0" would read "yes" rather than "no" as illustrated in FIG. 3. This is an obvious error. In response to identifying this error, the methodologies and/or systems hereof may present the information in the Visible column is presented in red and is preceded by an asterisk and a space: *Yes to indicate the conditional Yes. Significantly, technology hereof may allow state information from multiple sources to be gathered and compared. In many cases the source of the LUN:host assignment information is not aware of the source of the information indicating that a LUN is actually visible to the host port. The methodologies and/or systems hereof may thus allow this information from disparate sources to be analyzed in the aggregate to make better informed decisions for the user.

As another example, LUN 13 has been assigned to the host port but is not visible. This is an obvious error. So the text in the Visible column is changed to *No to indicate the conditional No.

As another example, LUN 4 has values of "Yes" for Bound, Cabled and Zoned. But the existing zone does not match the path that is actually cabled, and neither path goes to the ports that are bound to the LUN. If the user assigns LUN 4 to the selected host port, he/she will not get data transfer. The Visible column will not say Yes, even though the all the other values are Yes. To alert the user to this situation, the values in the Bound, Cabled and Zoned columns are all *Yes (conditional Yes). This indicates that there is a cable and a zone and binding, and that connects the LUN, its storage port(s), and host ports, but the configuration is not sufficient for data transfer.

Any time the five parameters (e.g., masked, bound, cabled, zoned, and visible are not logically consistent, the text in the "Visible" column, or one or more other column(s) should be flagged with an indication that the state presented in that column is conditional. In the particular examples, an asterisk and red color (or other highly indicative display means) may be used for this indication. When data is not available the corresponding field for that state information is left blank.

When multiple hosts are selected the methodologies and/or systems hereof may use AND logic for the columns. Only if Visible is Yes for all selected Host/LUN pairs will an unconditional "yes" be presented in the corresponding column. If it is No or Blank (Not Available) for any Host/LUN pair, a "No" or Blank is presented in the column. In a particular implementation, the connectivity values for all the assigned LUN/Hosts combinations in the Hosts table are determined when the user opens the tab. The connectivity values for only the selected LUNs/Hosts combinations in the LUNs table may be determined on demand when a user requests same, or may be determined automatically before or when the user opens the tab.

All other unselected Cabled, Zoned, Bound (or Host Connection), Masked, Visible cells in the LUNs table 303 will be blank. To compute values for other LUNs/Hosts combinations the user selects the objects of interest. The state information will be determined and presented upon a change of selection. The previously populated cells retain their data as long as there is valid data for the selected hosts. Although it is possible to compute all possibilities in advance and may be practical in smaller SANs, running all the possible combinations for thousands of LUNs and hundreds of hosts may consume a large amount of computing and network resources. Hence, an implementation hereof determines information only for user-selected variables.

In typical usage the user selects one or more of the objects (i.e., rows) in table 303 and one or more objects (i.e., rows) from table 305 in FIG. 3. The software application determines the connectivity values for each object set across the network. This determination may be performed by querying one or more databases or tables where the configuration and state information is maintained (see FIG. 1), or it may be obtained by actively testing the connectivity values in response to the user selection. In most cases SAN devices will include various types of instrumentation processes that periodically gather the connectivity information and store that in one or more databases, in which case the software application in accordance herewith will query those databases to determine the values that should be listed in each column entry. Thus, it may be that the functionality (methodology and/or system) may reside on a host 102, in a storage cell 101 or otherwise within a network 100.

Upon changing the selection in either table or list, the application hereof may re-compute the connectivity values. If the user selects more than one item from table 303 or 305, then the computed value is the logical sum of all the objects in the set. That is, for a connectivity value in the left hand table 303 to be "Yes," that connectivity element must be in place between that object and all the objects selected in the right hand table 305.

Tables 303/305 optionally support convenience features such as column heading controls that allow the tables to be sorted by clicking on the column heading. This assists the user in identifying particular objects in what can be a sizeable list of objects. Also, filter controls 309 can be used to select ranges objects for display. For example, the filter control 309 labeled LUNs may be used to allow the user to specify a particular drive array so that only LUNs from that array are presented in table 303. Similarly, the filter control 309 labeled "Hosts" may allow the user to specify a particular host computer so that only ports associated with that host computer are presented in table 305.

Each of the tables 303/305 described above may support a Details view such as that shown in FIG. 4 that may be launched by clicking on one of the "Details" buttons 307. Selecting a set of objects from either table 303 or 305 and then selecting the details button 307 causes table 400 to be presented. Table 400 includes a row (see e.g., rows 401) for every possible path between the two sides of the network. In this way the user can display which of the possible paths actually support connectivity, or which are closest to supporting connectivity. It should be noted that the number of possible paths increases geometrically as the number of ports, switches, and physical links between ports and switches increases. Hence, the number of entries presented in the details user interface 400 can be quite large. User interface 400 optionally support convenience features such as column heading controls that allow the tables to be sorted by clicking on the column heading. This may assist the user in identifying particular objects in what can be a sizeable list of objects.

Figure 5:
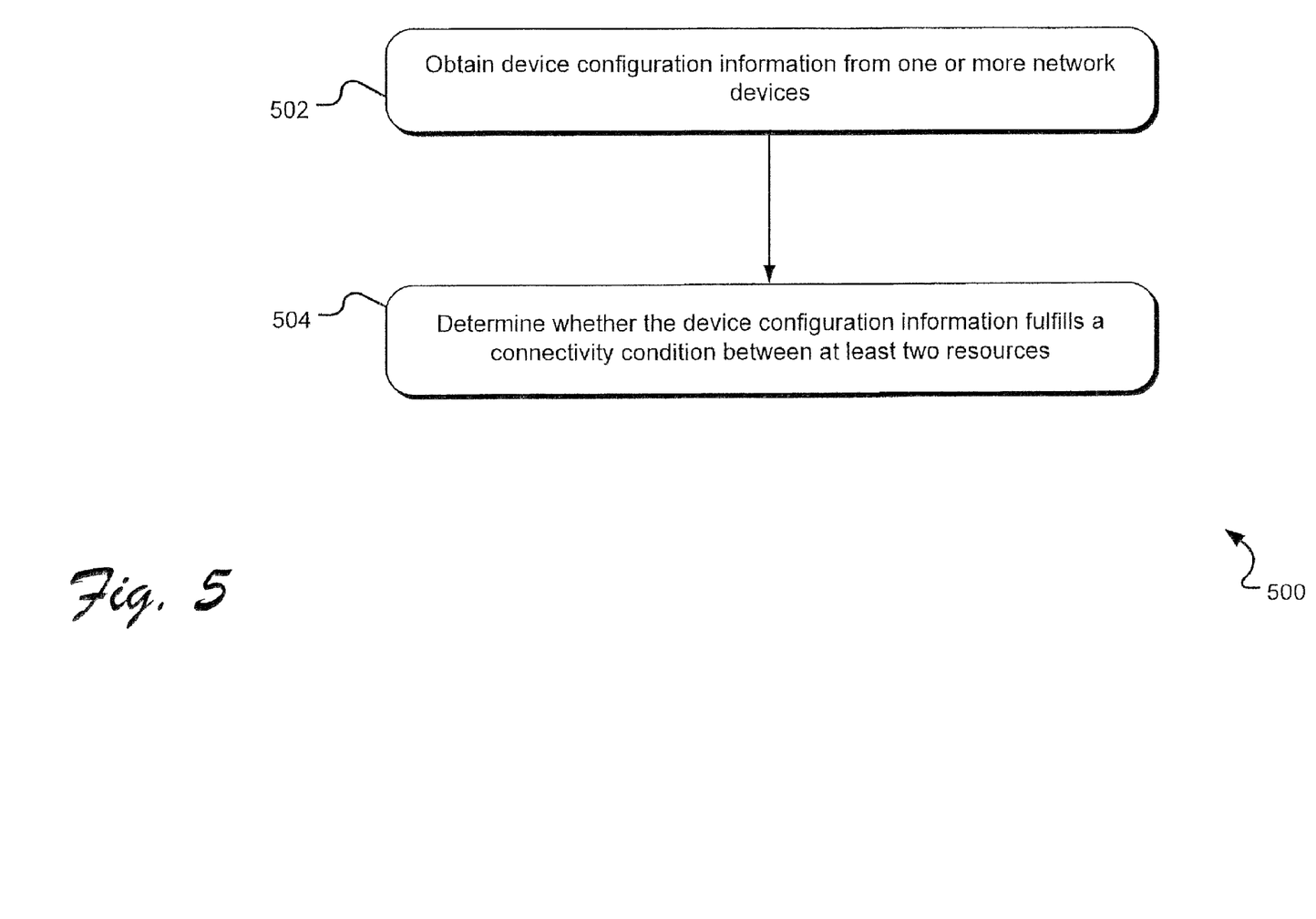
FIG. 5 illustrates exemplary operations for managing a storage area network; and, FIG. 6 illustrates an exemplary system useful in implementations of the described technology.

FIG. 5 illustrates exemplary operations 500 for managing a storage area network (SAN). An operation 502 for obtaining storage information may be performed. In an operation 504 for analyzing the storage information, the storage information may be analyzed for connectivity issues. Then, a determination operation 506 may be performed to establish a state of connectivity.

Figure 6:
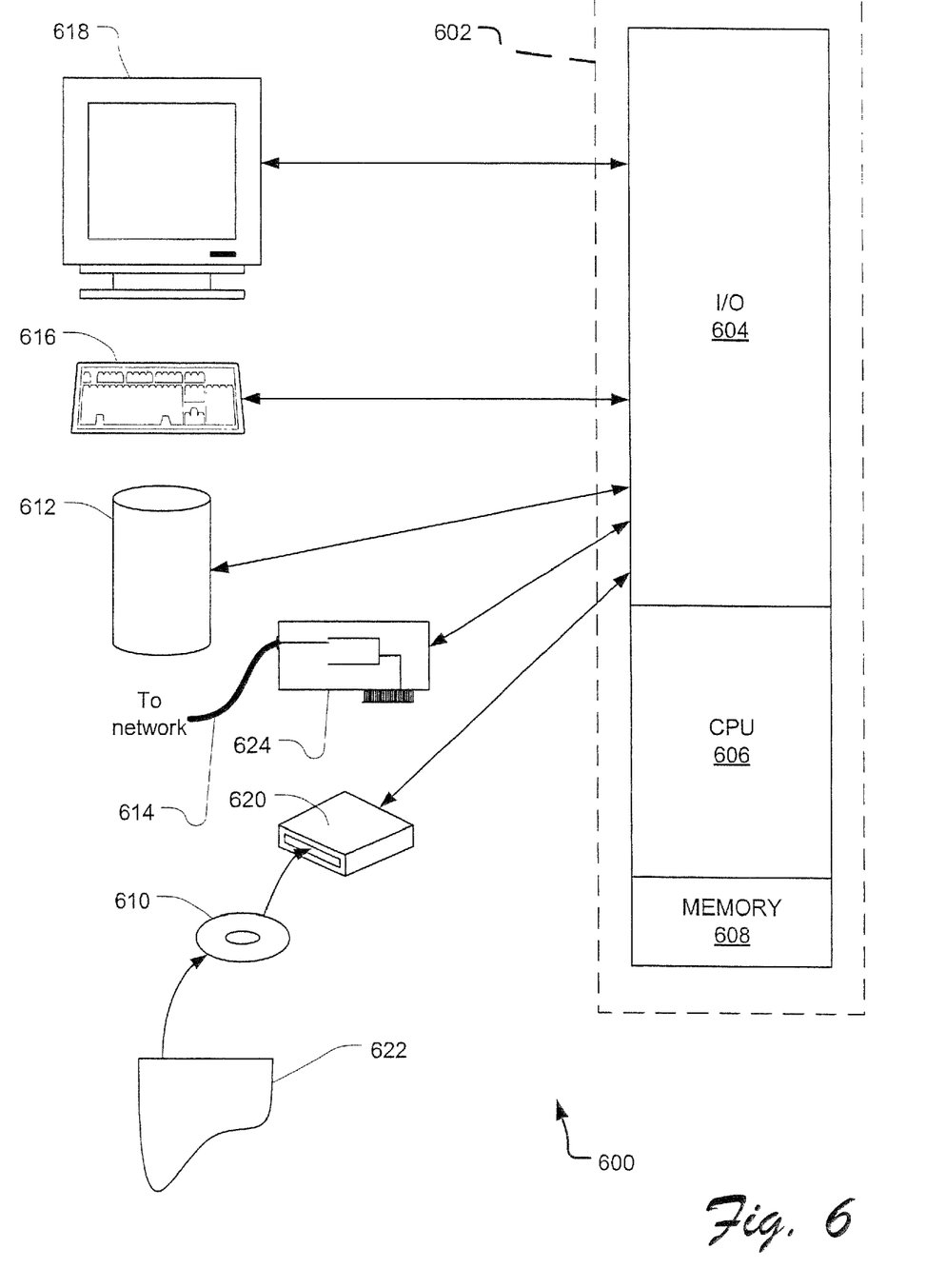

FIG. 6 illustrates an exemplary system useful in implementations of the described technology. A general purpose computer system 600 is capable of executing a computer program product to execute a computer process. Data and program files may be input to the computer system 600, which reads the files and executes the programs therein. Some of the elements of a general purpose computer system 600 are shown in FIG. 6 wherein a processor 602 is shown having an input/output (I/O) section 604, a Central Processing Unit (CPU) 606, and a memory section 608. There may be one or more processors 602, such that the processor 602 of the computer system 600 comprises a single central-processing unit 606, or a plurality of processing units, commonly referred to as a parallel processing environment. The computer system 600 may be a conventional computer, a distributed computer, or any other type of computer. The described technology is optionally implemented in software devices loaded in memory 608, stored on a configured DVD/CD-ROM 610 or storage unit 612, and/or communicated via a wired or wireless network link 614 on a carrier signal, thereby transforming the computer system 600 in FIG. 6 to a special purpose machine for implementing the described operations.

The I/O section 604 is connected to one or more user-interface devices (e.g., a keyboard 616 and a display unit 618), a disk storage unit 612, and a disk drive unit 620. Generally, in contemporary systems, the disk drive unit 620 is a DVD/CD-ROM drive unit capable of reading the DVD/CD-ROM medium 610, which typically contains programs and data 622. Computer program products containing mechanisms to effectuate the systems and methods in accordance with the described technology may reside in the memory section 604, on a disk storage unit 612, or on the DVD/CD-ROM medium 610 of such a system 600. Alternatively, a disk drive unit 620 may be replaced or supplemented by a floppy drive unit, a tape drive unit, or other storage medium drive unit. The network adapter 624 is capable of connecting the computer system to a network via the network link 614, through which the computer system can receive instructions and data embodied in a carrier wave. Examples of such systems include SPARC systems offered by Sun Microsystems, Inc., personal computers offered by Dell Corporation and by other manufacturers of Intel-compatible personal computers, PowerPC-based computing systems, ARM-based computing systems and other systems running a UNIX-based or other operating system. It should be understood that computing systems may also embody devices such as Personal Digital Assistants (PDAs), mobile phones, gaming consoles, set top boxes, etc.

When used in a LAN-networking environment, the computer system 600 is connected (by wired connection or wirelessly) to a local network through the network interface or adapter 624, which is one type of communications device. When used in a WAN-networking environment, the computer system 600 typically includes a modem, a network adapter, or any other type of communications device for establishing communications over the wide area network. In a networked environment, program modules depicted relative to the computer system 600 or portions thereof, may be stored in a remote memory storage device. It is appreciated that the network connections shown are exemplary and other means of and communications devices for establishing a communications link between the computers may be used.

In accordance with an implementation, software instructions and data directed toward creating and maintaining administration domains, enforcing configuration access control, effecting configuration access of SAN resources by a user, and other operations may reside on disk storage unit 609, disk drive unit 607 or other storage medium units coupled to the system. Said software instructions may also be executed by CPU 606.

The implementations described herein may be effectuated as logical steps in one or more computer systems. The logical operations hereof may be implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the alternatives described herein are referred to variously as operations, steps, objects, or modules. Furthermore, it should be understood that logical operations may be performed in any order, unless explicitly claimed otherwise or a specific order is inherently necessitated by the claim language.

It should be understood that logical operations described and claimed herein may be performed in any order, unless explicitly claimed otherwise or a specific order is inherently necessitated by the claim language.

The above specification, examples and data provide a complete description of the structure and use of exemplary implementations of the methodologies and/or systems hereof. Since many implementations hereof can be made without departing from the spirit and scope of the invention, the invention resides in the claims hereinafter appended. Furthermore, structural features of the different embodiments may be combined in yet another embodiment without departing from the recited claims.

What is claimed is:

1. A computerized method executable on a network device comprising:
    obtaining device connectivity configuration information regarding connectivity of devices in a network; wherein the device connectivity configuration information is obtained from information maintained by devices in the network and without sending a route request packet, and the device connectivity configuration information includes zoning information about the network; and
    computing, based on the device connectivity configuration information attributed to one or more possible paths between a first network resource in the network and a second network resource in the network, whether one or more network connectivity conditions are fulfilled for the one or more possible paths between the two network resources.

2. The computerized method of claim 1 wherein at least one of the one or more network connectivity conditions indicates whether a port of the first network resource for accessing the first network resource from the second network resource is defined.

3. The computerized method of claim 1 wherein at least one of the one or more network connectivity conditions indicates whether a port of the first network resource is connected with a port of the second network resource within a network.

4. The computerized method of claim 1 wherein least one of the one or more network connectivity conditions indicates that the defined port of the first network resource is connected with a port of the second network resource within the network if the port of the first network resource is connected via wireless and/or wired connections with the port of the second network resource.

5. The computerized method of claim 1 wherein at least one of the one or more network connectivity conditions indicates whether the first network resource is configured to allow communication with the second network resource.

6. The computerized method of claim 1 wherein at least one of the one or more network connectivity conditions indicates whether an active zone exists to communicatively connect a port of the first network resource with a port of the second network resource.

7. The computerized method of claim 1 wherein at least one of the one or more network connectivity conditions indicates whether a storage manager of the second network resource has an in-band view of the first network resource.

8. The computerized method of claim 1 wherein the first network resource is a LUN.

9. The computerized method of claim 1 wherein the second network resource is a host.

10. The computerized method of claim 1 wherein the second network resource is an application of a host.

11. A network device comprising:
    a processor configured to obtain device configuration information regarding connectivity of devices in a network and to compute, based on the device connectivity configuration information attributed to one or more possible paths between a first network resource in the network and a second network resource in the network, whether one or more network connectivity conditions are fulfilled for the one or more possible paths between the two network resources;
    wherein the device configuration information is obtained from information maintained by devices in the network and without sending a route request packet, and the device connectivity information includes zoning information about the network.

12. The network device of claim 11 wherein at least one of the one or more network connectivity conditions indicates whether a port of the first network resource for accessing the first network resource from the second network resource is defined.

13. The network device of claim 11 wherein at least one of the one or more network connectivity conditions indicates whether a port of the first network resource is connected with a port of the second network resource within a network.

14. The network device of claim 11 wherein at least one of the one or more network connectivity conditions indicates that port of the first network resource is connected with a port of the second network resource within the network if the port of the first network resource is connected via wireless and/or wired connections with the port of the second network resource.

15. The network device of claim 11 wherein at least one of the one or more network connectivity conditions indicates whether the first network resource is configured to allow communication with the second network resource.

16. The network device of claim 11 wherein at least one of the one or more network connectivity conditions indicates whether an active zone exists to communicatively connect a port of the first network resource with a port of the second network resource.

17. The network device of claim 11 wherein at least one of the one or more network connectivity conditions indicates whether a storage manager of the second network resource has an in-band view of the first network resource.

18. The network device of claim 11 wherein the first network resource is a LUN.

19. The network device of claim 11 wherein the second network resource is a host.

20. The network device of claim 11 wherein the second network resource is an application of a host.

* * * * *